US011329901B2

(12) United States Patent
Tidemann et al.

(10) Patent No.: US 11,329,901 B2
(45) Date of Patent: *May 10, 2022

(54) DYNAMIC INTER-CLOUD PLACEMENT OF VIRTUAL NETWORK FUNCTIONS FOR A SLICE

(71) Applicant: VMware, Inc., Palo Alto, CA (US)

(72) Inventors: Jeremy Tidemann, Urbana, IL (US); Constantine Polychronopoulos, Palo Alto, CA (US); Marc Andre Bordeleau, Shawinigan (CA); Edward Choh, Richmond (CA); Ojas Gupta, Mountain View, CA (US); Robert Kidd, Champaign, IL (US); Raja Kommula, Cupertino, CA (US); Georgios Oikonomou, Patras (GR)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/195,058

(22) Filed: Mar. 8, 2021

(65) Prior Publication Data

US 2021/0194778 A1 Jun. 24, 2021

Related U.S. Application Data

(63) Continuation of application No. 16/256,659, filed on Jan. 24, 2019, now Pat. No. 10,944,647.

(51) Int. Cl.
*H04L 12/24* (2006.01)
*H04L 12/26* (2006.01)
(Continued)

(52) U.S. Cl.
CPC ...... *H04L 41/5054* (2013.01); *G06F 9/45558* (2013.01); *H04L 41/0806* (2013.01);
(Continued)

(58) Field of Classification Search
CPC .............. H04L 41/5054; H04L 41/0806; H04L 41/0826; H04L 41/0893; H04L 41/5009;
(Continued)

(56) References Cited

U.S. PATENT DOCUMENTS

| 7,391,786 B1 | 6/2008 | Prasad |
| 7,719,982 B2 | 5/2010 | Varma |

(Continued)

FOREIGN PATENT DOCUMENTS

| CN | 107277883 A | 10/2017 |
| CN | 108540384 | 9/2018 |

(Continued)

OTHER PUBLICATIONS

"Idle mobility aspects to support network slicing", 3GP Draft; R2-1708083 Idle Mobility Aspects to Support Network Slicing, 3rd Generation Partnership Project (3GPP), Mobile Competence Centre; 650, Route Des Lucioles; F-06921 Sophia-Antipolis Cedex, vol. Ran W62, No. Berlin, Germany 20170821-20170825.

(Continued)

*Primary Examiner* — Sargon N Nano
*Assistant Examiner* — Chong G Kim
(74) *Attorney, Agent, or Firm* — Clayton, McKay & Bailey, PC

(57) ABSTRACT

Examples can include an optimizer that dynamically determines where to place virtual network functions for a slice in a distributed Telco cloud network. The optimizer can determine a slice path that complies with a service level agreement and balances network load. The virtual network functions of the slice can be provisioned at clouds identified by the optimal slice path. In one example, performance metrics are normalized, and tenant-selected weights can be applied. This can allow the optimizer to prioritize particular SLA attributes in choosing an optimal slice path.

20 Claims, 9 Drawing Sheets

(51) Int. Cl.

| | | |
|---|---|---|
| *G06F 9/455* | (2018.01) | |
| *H04L 12/851* | (2013.01) | |
| *H04L 29/08* | (2006.01) | |
| *H04L 41/5054* | (2022.01) | |
| *H04L 41/5025* | (2022.01) | |
| *H04L 41/5009* | (2022.01) | |
| *H04L 41/0826* | (2022.01) | |
| *H04L 43/0882* | (2022.01) | |
| *H04L 41/0893* | (2022.01) | |
| *H04L 41/0806* | (2022.01) | |
| *H04L 47/2425* | (2022.01) | |
| *H04L 67/101* | (2022.01) | |

(52) U.S. Cl.
CPC ...... *H04L 41/0826* (2013.01); *H04L 41/0893* (2013.01); *H04L 41/5009* (2013.01); *H04L 41/5025* (2013.01); *H04L 43/0882* (2013.01); *H04L 47/2425* (2013.01); *G06F 2009/4557* (2013.01); *G06F 2009/45595* (2013.01); *H04L 67/101* (2013.01)

(58) Field of Classification Search
CPC ............. H04L 41/5025; H04L 43/0882; H04L 47/2425; H04L 67/101; G06F 9/45558; G06F 2009/4557; G06F 2009/45595
See application file for complete search history.

(56) References Cited

U.S. PATENT DOCUMENTS

| | | |
|---|---|---|
| 9,173,156 B2 | 10/2015 | Bai |
| 9,722,935 B2 | 8/2017 | Bouanen |
| 9,961,624 B1 | 5/2018 | Zait |
| 10,182,129 B1 | 1/2019 | Peterson |
| 10,374,956 B1 | 8/2019 | Tracy |
| 10,601,724 B1 | 3/2020 | Filsfils |
| 2008/0075002 A1 | 3/2008 | Fourcand |
| 2010/0074113 A1 | 3/2010 | Muramoto |
| 2012/0281528 A1 | 11/2012 | Hong |
| 2013/0282893 A1 | 10/2013 | Pearce |
| 2015/0029853 A1 | 1/2015 | Raindel |
| 2015/0326448 A1 | 11/2015 | Chaudhary |
| 2015/0326451 A1 | 11/2015 | Rao |
| 2016/0048402 A1 | 2/2016 | Tsirkin |
| 2016/0132798 A1 | 5/2016 | Picard |
| 2016/0154660 A1 | 6/2016 | Clark |
| 2016/0261495 A1 | 9/2016 | Xia |
| 2016/0344565 A1 | 11/2016 | Batz |
| 2016/0359872 A1 | 12/2016 | Yadav |
| 2017/0214623 A1 | 7/2017 | Finkelstein |
| 2017/0289270 A1 | 10/2017 | Li |
| 2017/0346885 A1 | 11/2017 | Jiang |
| 2018/0103091 A1 | 4/2018 | Kwak |
| 2018/0131578 A1 | 5/2018 | Cui |
| 2018/0131616 A1 | 5/2018 | Laberge |
| 2018/0139129 A1 | 5/2018 | Dowlatkhah |
| 2018/0152958 A1 | 5/2018 | Arnold |
| 2018/0242161 A1 | 8/2018 | Vulgarakis Feljan |
| 2018/0287891 A1 | 10/2018 | Shaw |
| 2018/0295180 A1 | 10/2018 | Yang |
| 2018/0316608 A1 | 11/2018 | Dowlatkhah |
| 2018/0316615 A1 | 11/2018 | Shaw |
| 2018/0376338 A1 | 12/2018 | Ashrafi |
| 2019/0014496 A1 | 1/2019 | Kim |
| 2019/0028382 A1 | 1/2019 | Kommula |
| 2019/0034220 A1 | 1/2019 | Padmanabhan |
| 2019/0053104 A1 | 2/2019 | Qiao |
| 2019/0140904 A1 | 5/2019 | Huang |
| 2019/0253962 A1 | 8/2019 | Kiessling |
| 2019/0281466 A1 | 9/2019 | Zhang |
| 2019/0319840 A1 | 10/2019 | Cheng |
| 2019/0394132 A1 | 12/2019 | Zhang |
| 2020/0029242 A1 | 1/2020 | Andrews |
| 2020/0068430 A1 | 2/2020 | Chan |
| 2020/0099625 A1 | 3/2020 | Yigit |
| 2020/0128445 A1 | 4/2020 | Dong |
| 2020/0186411 A1 | 6/2020 | Ravichandran |
| 2020/0221346 A1 | 7/2020 | Park |

FOREIGN PATENT DOCUMENTS

| | | |
|---|---|---|
| KR | 1020180009046 | 1/2018 |
| WO | WO2016049332 | 3/2016 |
| WO | WO2018214506 | 11/2018 |
| WO | WO2018224151 | 12/2018 |

OTHER PUBLICATIONS

"International Search Report dated May 18, 2020 for PCT/US2020/014661".

"International Search Report dated Jul. 16, 2020 for PCT/US2020/032769".

"International Search Report dated Jul. 21, 2020 for PCT/US2020/032764".

"International Search Report dated Jul. 22, 2020 for PCT/US2020/032768".

Gouareb, Racha , "Virtual Network Functions Routing and Placement for Edge Cloud Latency Minimization", IEEE Journal on Selected Areas in Communications (vol. 36, Issue 10), sections I-V, Sep. 24, 2018.

|       | VNF1    | VNF2    | VNF3    |
|-------|---------|---------|---------|
| PATH 0 | CLOUD-0 | CLOUD-1 | CLOUD-2 |
| PATH 1 | CLOUD-0 | CLOUD-1 | CLOUD-3 |
| PATH 2 | CLOUD-0 | CLOUD-1 | CLOUD-4 |
| PATH 3 | CLOUD-0 | CLOUD-1 | CLOUD-5 |

*FIG. 4A*

|         | CLOUDINDEX |         | LOAD  |
|---------|------------|---------|-------|
| CLOUD-0 | 0          | CLOUD-0 | 0.993 |
| CLOUD-1 | 1          | CLOUD-1 | 0.835 |
| CLOUD-2 | 2          | CLOUD-2 | 0.178 |
| CLOUD-3 | 3          | CLOUD-3 | 0.019 |
| CLOUD-4 | 4          | CLOUD-4 | 0.800 |
| CLOUD-5 | 5          | CLOUD-5 | 0.958 |
| CLOUD-6 | 6          | CLOUD-6 | 0.221 |
| CLOUD-7 | 7          | CLOUD-7 | 0.155 |

*FIG. 4B*

|         | CLOUD-0 | CLOUD-1 | CLOUD-2 | CLOUD-3 | CLOUD-4 | CLOUD-5 | CLOUD-6 | CLOUD-7 |
|---------|---------|---------|---------|---------|---------|---------|---------|---------|
| CLOUD-0 | 1.0     | 24.1    | 21.5    | 23.8    | 48.9    | 20.2    | 45.4    | 43.7    |
| CLOUD-1 | 27.1    | 1.0     | 10.3    | 35.6    | 29.9    | 11.1    | 12.9    | 13.1    |
| CLOUD-2 | 22.8    | 15.7    | 1.0     | 48.6    | 48.3    | 33.3    | 36.4    | 42.1    |
| CLOUD-3 | 28.3    | 47.1    | 41.0    | 1.0     | 38.9    | 24.6    | 45.7    | 25.7    |
| CLOUD-4 | 23.9    | 23.7    | 45.8    | 41.2    | 1.0     | 17.4    | 14.6    | 42.0    |
| CLOUD-5 | 33.9    | 19.3    | 24.3    | 32.8    | 29.4    | 1.0     | 15.0    | 35.2    |
| CLOUD-6 | 40.2    | 10.8    | 12.1    | 28.4    | 19.4    | 28.2    | 1.0     | 47.7    |
| CLOUD-7 | 14.9    | 35.8    | 47.6    | 49.2    | 21.5    | 13.6    | 45.6    | 1.0     |

FIG. 4C

| | CLOUDPLACEMENT 440 | | | DIMENSIONALCOST 445 | | NORMALIZEDCOST 450 | | WEIGHTEDCOST 455 | | COST COMPOSITE 460 |
|---|---|---|---|---|---|---|---|---|---|---|
| | VNF1 | VNF2 446 | VNF3 | CLOUDLOAD | RTT 447 | CLOUDLOAD | RTT | CLOUDLOAD | RTT | |
| PATH 53 | CLOUD-0 | CLOUD-3 | CLOUD-3 472 | 1.031 | 24.8 | 4.122 | 0.496 | 2.061 | 2.479 | 4.540 470 |
| PATH 30 | CLOUD-0 | CLOUD-2 | CLOUD-2 | 1.348 | 22.5 | 5.393 | 0.450 | 2.696 | 2.250 | 4.946 |
| PATH 168 | CLOUD-0 | CLOUD-2 | CLOUD-0 | 2.978 | 2.0 | 11.913 475 | 0.040 476 | 5.956 | 0.200 | 6.156 |
| PATH 156 | CLOUD-0 | CLOUD-0 | CLOUD-0 | 2.004 | 24.8 | 8.017 | 0.496 | 4.009 | 2.479 | 6.488 |
| PATH 155 | CLOUD-0 | CLOUD-0 | CLOUD-2 | 2.163 | 22.5 | 8.653 | 0.450 | 4.326 | 2.250 | 6.576 |
| PATH 145 | CLOUD-0 | CLOUD-7 | CLOUD-7 | 1.303 | 44.7 | 5.213 | 0.894 | 2.606 | 4.470 | 7.076 |
| PATH 49 | CLOUD-0 | CLOUD-3 | CLOUD-7 | 1.167 | 49.5 | 4.667 | 0.989 | 2.334 | 4.946 | 7.280 |
| PATH 0 | CLOUD-0 | CLOUD-1 | CLOUD-2 | 2.006 | 34.4 | 8.024 | 0.689 | 4.012 | 3.444 | 7.456 |
| PATH 122 | CLOUD-0 | CLOUD-6 | CLOUD-6 | 1.435 | 46.4 | 5.742 | 0.928 | 2.871 | 4.640 | 7.511 |
| PATH 5 | CLOUD-0 | CLOUD-1 | CLOUD-7 | 1.983 | 37.2 | 7.934 | 0.743 | 3.967 | 3.717 | 7.683 |

*FIG. 4D*

DYNAMIC INTER-CLOUD PLACEMENT OF VIRTUAL NETWORK FUNCTIONS FOR A SLICE

This application claims priority as a continuation of U.S. patent application Ser. No. 16/256,659, entitled "Dynamic Inter-cloud Placement of Virtual Network Functions for a Slice," filed Jan. 24, 2019, which is incorporated by reference herein in its entirety.

BACKGROUND

Today's 3G, 4G, and LTE networks operate using multiple data centers ("DCs") that can be distributed across clouds. These networks are centrally managed by only a few operating support systems ("OSSs") and network operations centers ("NOCs"). 5G technology will dramatically increase network connectivity for all sorts of devices that will need to connect to the Telco network and share the physical network resources. Current network architectures cannot scale to meet these demands.

Network slicing is a form of virtualization that allows multiple logical networks to run on top of a shared physical network infrastructure. A distributed cloud network can share network resources with various slices to allow different users, called tenants, to multiplex over a single physical infrastructure. For example, Internet of Things ("IoT") devices, mobile broadband devices, and low-latency vehicular devices will all need to share the 5G network. These different applications will have different transmission characteristics and requirements. For example, the IoT will typically have a large number of devices but very low throughput. Mobile broadband will be the opposite, with each device transmitting and receiving high bandwidth content. Network slicing can allow the physical network to be partitioned at an end-to-end level to group traffic, isolate tenant traffic, and configure network resources at a macro level.

However, current slicing technology is confided to a single datacenter. Applying this technology across multiple clouds to accommodate slices on the physical network is insufficient and introduces several problems. Because demands fluctuate at different times and locations, a particular geographic location may not have enough compute resources or bandwidth to simply reserve multiple slice paths in a static fashion. Doing so can create bottlenecks and other inefficiencies that limit the gains otherwise promised by 5G technology. As an example, one company may want a long-term lease of a first network slice for connectivity of various sensors for IoT tasks. Meanwhile, a sporting event can require a short-term lease of a network slice for mobile broadband access for thousands of attendees. With a static approach, it may be impossible to satisfy both requirements of the physical network.

Current methods for determining placement of virtual network functions ("VNFs") in a slice do not take multi-cloud network demands into account. Instead, they consider a single data center at a time when determining how to scale out while meeting network demands. From a multiple-cloud standpoint, existing technologies simply determine the shortest or fastest path between VNFs. Not only will this create bottlenecks, but it also falls short of determining the best arrangement for the particular slice, leaving a slice's particular performance metric needs unaddressed. In addition, statically placing these VNFs in slices on the physical network can again inefficiently reserve physical and virtual resources that are not needed or that change over a time period. For example, a sporting event could cause existing slice performance to suffer and fall below service level agreement ("SLA") requirements.

As a result, a need exists for dynamic cross-cloud placement of VNFs within network slices.

SUMMARY

Examples described herein include systems and methods for dynamic inter-cloud VNF placement in a slice path over a distributed cloud network. The slices can span a multi-cloud topology. An optimizer can determine a slice path that will satisfy an SLA while also considering cloud load. The optimizer can be part of an orchestrator framework for managing a virtual layer of a distributed cloud network.

In one example, the optimizer can identify an optimal slice path that meets the SLA (or violates the SLA to the lowest extent), while balancing network resources. This means the optimizer will not necessarily choose the shortest or fastest possible path between VNFs. This can provide technical advantages over algorithms such as a Dijkstra algorithm that is single dimensional and would be used to find the shortest path. By considering multiple dimensions all together, the optimizer can balance SLA compliance and network performance. This approach can also allow the optimizer to flexibly incorporate additional SLA attributes, new weights, and react to changing network conditions.

In one example, the optimizer can start determining a slice path from an edge cloud. This can include determining a neighborhood of available clouds based on the number of VNFs in the slice and a maximum number of intercloud links. Limiting intercloud links can keep the pool of candidate slice paths more manageable from a processing standpoint. Each candidate slice path can include VNFs placed at a different combination of clouds. The number of different clouds in a candidate slice path can be less than or equal to both (1) the total number of available clouds or (2) the maximum number of intercloud links plus one. Within those boundaries, permutations of VNF-to-cloud assignments can be considered as candidate slice paths.

The optimizer can determine a performance metric for the candidate slice paths corresponding to an SLA attribute of the slice. The optimizer can also determine loads for the candidate slice paths based on load values of the corresponding clouds. In one example, the optimizer can identify a slice path with the best composite performance. The best composite performance can include both the weighted load and performance metrics and can be based on the lowest overall composite score in one example. Then the system can instantiate the VNFs at corresponding clouds specified by the slice path with the best composite score. The slice path with the best composite score can be referred to as "the best composite slice path."

In one example, a graphical user interface ("GUI") can allow a user to adjust weights for SLA attributes. For example, a tenant can make a GUI selection that weights an SLA attribute relative to a second SLA attribute. The optimizer can use these weights to choose optimal VNF placement, while still balancing against network load of the slice path.

In one example, the optimizer can determine candidate slice paths relative to an edge cloud. Each candidate slice path considers a unique permutation of VNF-to-cloud assignments for a given service function chain. The optimizer can rank the candidate slice paths based on the relative weightings of performance metrics corresponding to the SLA attributes and a load for the candidate slice path. This can allow the optimizer to balance network requirements while still determining VNF locations based on SLA compliance, rather than simply picking the shortest or fastest path. The optimizer (which can be considered part of an orchestrator) can then provision the VNFs at the clouds specified by a top ranked slice path.

These stages can be performed by a system in some examples. Alternatively, a non-transitory, computer-readable medium including instructions can cause a processor to perform the stages when the processor executes the instructions.

Both the foregoing general description and the following detailed description are exemplary and explanatory only and are not restrictive of the examples, as claimed.

BRIEF DESCRIPTION OF THE DRAWINGS

FIG. 4A is an example table of candidate slice paths used for determining optimal VNF placements.

FIG. 4B is an example table of loads for clouds.

FIG. 4C is an example matrix of cloud round-trip times between clouds.

FIG. 4D is an example table of candidate slice paths with composite scores.

DESCRIPTION OF THE EXAMPLES

Figure 1A:
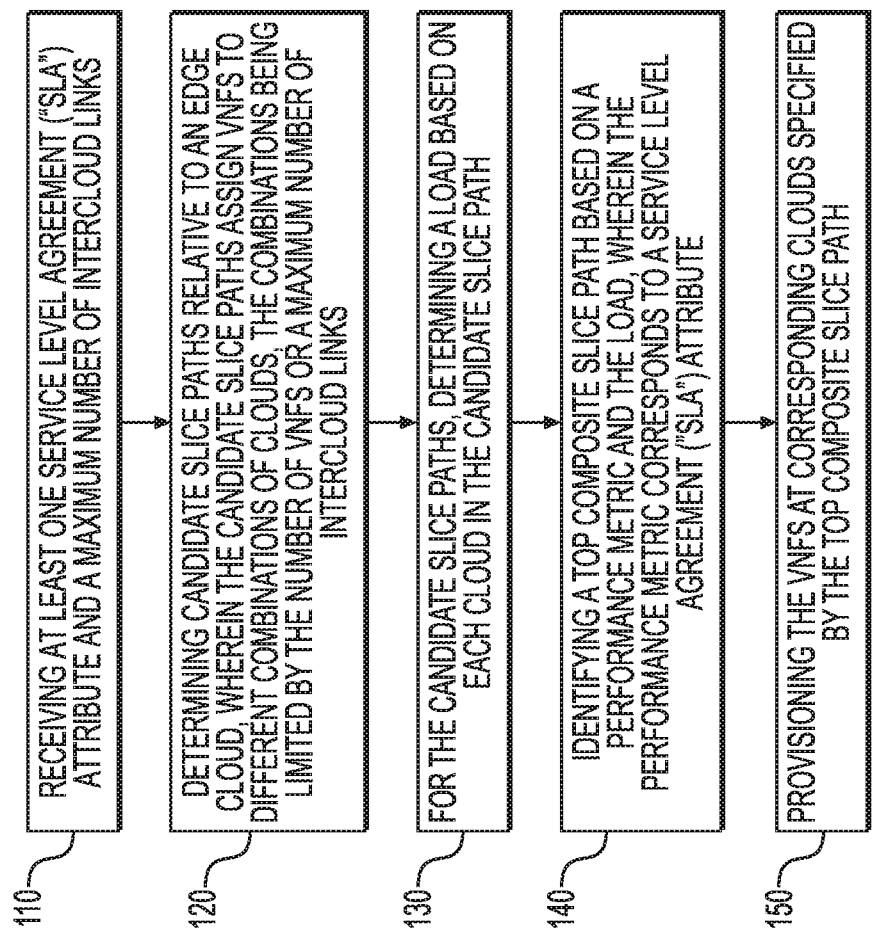
FIG. 1A is a flowchart of an example method for dynamic inter-cloud VNF placement in a slice path.

Reference will now be made in detail to the present examples, including examples illustrated in the accompanying drawings. Wherever possible, the same reference numbers will be used throughout the drawings to refer to the same or like parts.

In one example, a system dynamically chooses optimal VNF locations for slices in a distributed multi-cloud environment, such as a Telco cloud environment. A Telco provider can have numerous data center environments, each of which can be a cloud. Each cloud can be one of several nodes located at various geographic locations in the distributed Telco network. Edge clouds can be those closest to user devices, such as cell phones, tablets, computers, IoT devices, and other processor-enabled devices that can connect to a mobile network. Edge clouds can act as ingress points for devices utilizing the Telco network. Core clouds can be at least one link removed from the user devices and can include core data centers in an example. Core clouds and can act as egress points to the internet if, for example, a VNF located at the core cloud is responsible for connecting to the internet. Edge clouds can also act as egress points in an example, but as will be discussed, the provider can avoid this configuration for congestion reasons in some instances.

A provider of the Telco network can lease portions of the network to tenants. These portions can be leased to tenants for specific purposes or services. For example, the lease can be used for particular applications, IoT devices, or customers. To allow multiple tenants to use portions of the Telco network, the provider can create and manage one or more network slices, referred to as "slices" for convenience. Each slice can be a virtual network that runs on top of a shared physical network infrastructure distributed across the Telco clouds. In effect, slicing can allow the provider to reserve some portion of the distributed network for each tenant. Network slices can be assigned to different tenants, and in some examples a single tenant can have multiple slices for different purposes. An SLA can define which performance metrics are required for the slice. Required performance metrics can vary between slices, depending on the intended use of a given slice.

A slice can include a service chain of VNFs for performing certain network tasks. The required combination of VNFs can differ based on the intended use of the slice, such as video streaming or IoT device management. The SLA or a separate slice record can specify which VNFs make up the service chain.

To instantiate the slice, the VNFs can be deployed across a slice path. The slice path can represent a subset of the provider's distributed network and can span one or more clouds. The slice path can include virtual and physical elements (such as compute, network, and storage elements) that provide functionality to the network slice. The virtual elements can include the VNFs required for the particular slice. These can operate in virtual machines ("VMs") and utilize virtual computer processing units ("vCPUs"). The slice path can begin at an edge cloud that provides an access point to user devices, but VNFs in the service chain can be placed elsewhere on other clouds. In a multi-cloud setting, the slice path can include be along a selected permutation of VNF-to-cloud assignments.

Because the physical infrastructure of a Telco network is both shared and limited, multiple slices can compete for utilization of that infrastructure. As operating conditions change, the optimizer (or other part of an orchestrator) can evaluate a new slice path based on current conditions and SLA requirements. Placement of VNFs can be optimized based on various dimensional costs such as performance metrics in the SLA, compute costs, and network utilization. The optimal slice path can represent a tradeoff between satisfying SLA performance metrics and orchestrating resources in a multi-cloud environment. In one example, the service provider can instantiate VNFs at the cloud locations specified in the optimal slice path. The optimizer can continue to monitor metrics and cloud loads and redistribute the VNFs along a new optimal slice path once metrics or loads fall outside of SLA and cloud load thresholds.

FIG. 1 is an example flow chart for dynamic inter-cloud VNF placement for a slice. An optimizer can be a process running in a core cloud of the provider. The optimizer can run on a server as part of a suite of data center management tools, in an example. The optimizer can select an optimal slice path for a slice, placing VNFs at clouds in a manner that balances required SLA metrics with impact on network resources.

To determine an optimal slice path, the optimizer can consider performance requirements of the SLA, cloud resource utilization based on load distribution, and performance metric prioritization for slices. In general, the optimizer can use the cloud loads to choose a slice path that balances network congestion against SLA requirements. Often, edge clouds will have the best performance metrics but the worst cloud load. Because edge clouds are ingress points, various performance metrics such as round-trip time ("RTT") will be lowest when all of the VNFs are at the edge cloud. However, only so many VMs can run on any one edge cloud. Therefore, to allow for greater network scalability, the optimizer can balance the needs of the particular slice with the overall network utilization, in an example. The optimizer can attempt to distribute VNFs in a manner that satisfies the SLA while preserving resources at the various clouds, including the edge cloud.

At stage 110, the optimizer can receive an SLA attribute required by a slice. SLA attributes can be any required performance metric of the slice. Example SLA attributes include maximum latency or round-trip time, minimum bandwidth, and maximum jitter. SLA attributes can be different and be prioritized differently between slices, largely depending on the services provided by the slice. For example, high bandwidth may be most important for video streaming, whereas low latency may be most important for automated driving. A tenant can specify which SLA attributes apply to a slice, in an example.

In one example, the SLA attribute is received from a GUI, such as an operator console. An operator can manually enter SLA attributes that apply to a slice. In another example, the SLA attribute can be received from a stored slice record. Slice records can be defined for a tenant to programmatically define various slice requirements. For example, a slice record can not only define which SLA attributes apply to the slice, but it can also specify which VNFs are required, particular geographies needed, and monetary spends permitted for the slice. For example, if a service is being offered in San Francisco, a slice record can ensure that particular VNFs are placed near this location. One or more required edge clouds can be specified for access to the slice by user devices.

The optimizer can also receive a maximum number of intercloud links. In one example, the maximum number of intercloud links can be configured automatically or manually based on slice path performance and to limit the degree of slice path drift across the clouds. This number can define how many connections between different clouds are permitted for the slice path. Because VNFs can be distributed on a slice path that spans multiple cloud locations, a limitation on the number of links between these clouds can help the optimizer define a universe of candidate slice paths. Additionally, slice performance can generally suffer if too many intercloud links are introduced. In one example, the maximum number of intercloud links is between five and ten. The number of permissible intercloud links can be entered into a GUI by an operator, in one example. Different maximum intercloud link numbers can apply to different slices and tenants.

Upon being notified to determine VNF placements for a slice, at stage 120, the optimizer can determine candidate slice paths relative to an edge cloud. In some examples, the edge cloud is specified in a slice record associated with the slice or tenant to whom the slice is leased or assigned. The edge cloud can alternately be selected based on a geographic attribute in the SLA or other information provided by the provider or tenant. Starting from the edge cloud, the optimizer can determine a neighborhood of other available clouds. Then combinations of these available clouds can make up the candidate slice paths.

The pool of candidate slice paths can be limited based on (1) the number of VNFs in the service chain of the slice, and (2) the maximum number of intercloud links. For example, if a slice includes four VNFs, each candidate slice path can include four or fewer clouds. The number and types of VNFs for any particular slice can vary, based on the intended use of the slice. A slice record can define a series of VNFs for whatever use the tenant or provider has for that slice. These VNFs can be placed on various clouds, starting with the edge cloud that acts as an access point (for example, for video streaming requests or automobile communications).

The VNFs can connect with each other over intercloud links when they are located at different clouds, forming the slice path. One or more of the VNFs can provide connection, for example, to a particular data center or the internet. Clouds with these VNFs can be considered egress clouds.

The maximum number of intercloud links can further reduce the pool of candidate slice paths, ensuring that the optimization can be performed in a computationally efficient manner. As an example, if the maximum number is three, then the candidate slice paths can be limited to four or fewer different clouds in any one slice path (since there are three links between four clouds). If there are more than three VNFs, this can mean the candidate slice paths will include at least one cloud with multiple VNFs. In another example, the number of intercloud links can be used to eliminate clouds from the neighborhood of potential clouds. For example, clouds that require too many network hops relative to the edge cloud can be left out of the candidate slice paths. As one example, if cloud 6 is five cloud hops away from the edge cloud and the maximum for intercloud links is three, cloud 6 can be removed from the neighborhood of available clouds. In this way, the maximum number of intercloud links can be configured to manage the pool size for candidate slice paths and to limit the degree of slice path drift across the clouds.

The optimizer can further limit the candidate slice paths based on performance metrics. For example, performance metrics of the candidate slice paths can be measured to determine if a candidate slice path complies with SLA requirements. In one example, a prioritized SLA attribute can be used to eliminate candidate slice paths that do not meet the requirements of the SLA attribute.

As an example, a first slice can prioritize latency over bandwidth, meaning only slice paths that meet the latency SLA requirements will be candidates. A second slice can prioritize bandwidth over latency, causing the optimizer to focus on bandwidth performance. In another example, a slice record can indicate that round-trip time ("RTT") is prioritized. In response, the optimizer can include RTT metrics for the candidate slice paths and eliminate candidate slice paths with RTT above the SLA requirement. To do this, the optimizer can create an intercloud matrix that includes an RTT between each candidate cloud. Using these RTT values, the optimizer can derive a total RTT for each candidate slice path. The derivation can be a sum or other function. This total RTT value can be stored as a dimensional performance cost for each candidate path. Other dimensional performance costs can be determined for each candidate slice path using a similar methodology.

In one example, the dimensional performance costs are normalized. The normalization can be proportional to the SLA attribute. For example, if the SLA attribute specifies a maximum RTT of 50 milliseconds, normalization can include dividing the total RTT value (dimensional performance cost) by 50 milliseconds. A result greater than 1 can indicate the SLA attribute is not met, whereas a result of less than 1 indicates it is met. Alternatively, different linear or non-linear functions can be used to normalize values for an SLA attribute. The candidate slice paths can be ranked according to the normalized performance cost, in an example. Candidates that do not comply with the SLA attribute can be omitted.

In another example, candidate slice paths that do not meet the SLA requirement can remain in the pool of candidate slice paths if no other candidates satisfy the SLA requirement. In that example, the optimizer can retain some number of candidate slice paths organized by how close they come to meeting the SLA requirement. This can help ensure that the optimizer chooses a slice path that is close to satisfying the SLA requirement. For example, a minimum of ten candidate slice paths can be retained in one example, even if not all of the candidate slice paths meet the SLA requirement. However, the non-compliant candidate slice paths can be ranked according to how close they come to meeting the SLA requirement, and those falling below the threshold number of candidate slice paths can be omitted.

The optimizer can also narrow the pool of candidate slice paths based on specific VNF requirements, in an example. For example, a slice record can specify that a particular VNF in the function chain is required to be within a certain distance of a geographic location or have direct connectivity to a particular egress point. Alternatively, a VNF requirement can specify a particular cloud to use with a VNF. These sorts of VNF requirements can be useful, for example, when the slice must connect to a geographically specific data center or have a specific egress point. The optimizer can use the VNF requirements to limit the pool of candidate slice paths accordingly. For example, if a slice record specifies a geographic requirement for VNF3, the optimizer can limit candidate slice paths to those where VNF3 is on a cloud meeting the geographic requirement.

In one example, the candidate slice paths are determined by an intersection of two sets of slice paths. The first set can include every slice path in the neighborhood of an edge cloud that is less than or equal to the number of VNFs and maximum intercloud links. The second set can include every slice path that satisfies the SLA for a performance metric. Alternatively, the second set can include slice paths closest to satisfying the SLA when no candidates slice paths satisfy it. Then the optimizer can take the intersection of the first and second sets. The remaining slice paths can be the candidate slice paths.

At stage 130, the optimizer can determine loads for the candidate slice paths. For example, the optimizer can determine load values for each cloud in the candidate slice paths, then add those up. As mentioned previously, the optimizer can use the cloud loads to balance network congestion against SLA requirements. One goal of orchestrating a Telco network is to avoid overburdening a cloud and allow for greater network scalability. The optimizer therefore can use load values to select an optimal slice path that uses clouds that may be underutilized compared to clouds in other candidate slice paths. The optimizer can attempt to distribute VNFs in this manner while still satisfying SLA requirements.

Cloud loads can be calculated proportionally to the demands of a slice, in one example. For example, if an edge cloud has 100 vCPUs and ten slices, the edge node can be considered 90% utilized from the perspective of any slice utilizing 9 vCPUs. However, different examples can calculate cloud loads differently. Load can be based on, for example, compute load (i.e., the percentage of vCPUs utilized), storage, network capacity, bandwidth, or other metrics that can be assigned a cost.

The load values can also be normalized, in an example. The function for normalizing the load value can depend on the manner in which the load is calculated. The optimizer can also weight the candidate paths based on the load values. In general, the optimizer can weight candidates negatively for high loads and positively for low loads. This can cause a candidate slice path with lower network utilization to be ranked ahead of one with high utilization if performance metrics are otherwise equal.

At stage 140, the optimizer can use the loads and performance metrics to determine a slice path with the best composite score. In one example, this can include normalizing and weighting the dimensional performance costs (performance metrics) and the loads. Then those values can be combined together to arrive at a composite score that, to some degree, represents both.

The optimizer can separately weight normalized load costs and normalized performance costs to create the weighted candidate slice paths, in an example. The relative balance of these different weights can be based on selections from an operator or values from an orchestration process, in an example. A higher relative weight for loads can indicate an emphasis on balancing the network versus providing peak slice performance. For example, a load weight can be twice as much as a performance weight.

The weights can be multiplied against the normalized values. The resulting weighted costs for performance metrics and loads can be summed or otherwise used to determine a composite score from which the optimal slice path is selected.

By collapsing multiple metrics into a composite score, slice paths with multiple dimensional attributes can be evaluated based on a single composite dimension. This can greatly reduce computational complexity, making dynamic inter-cloud VNF allocation possible where it might not otherwise be. Furthermore, the relative priority of various metrics such as slice RTT and monetary cost can be configurable by the tenant. Reducing these to a consistent composite dimension can allow the optimizer to perform efficiently even when the numbers and weights of metrics are changed.

At stage 140, the optimizer can identify a slice path with the best composite score based on the weighted candidate slice paths. In one example, creating a composite slice path can include calculating a composite value based on the load and performance values. In one example, the weighted load and performance costs are added together to yield a composite score. The candidate slice paths can be ranked based on the lowest composite score, and the top-ranked result can be identified as the slice path with the best composite score. This can be the optimal slice path.

Using the composite score can allow the optimizer to identify an optimal slice path that meets the SLA (or violates the SLA to the lowest extent), while balancing network resources. This means the optimizer will not necessarily choose the shortest or fastest possible path between VNFs. This can provide technical advantages over algorithms such as a Dijkstra algorithm that is single dimensional and would be used to find the shortest path. By considering multiple dimensions all together, the optimizer can balance SLA compliance and network performance. This approach can also allow the optimizer to flexibly incorporate additional SLA attributes, new weights, and react to changing network conditions.

At stage 150, the orchestrator or optimizer can provision the VNFs in the manner specified by the slice path with the best composite score. This best composite slice path includes associations between each VNF and a respective cloud. The orchestrator or optimizer can provision the VNFs at those clouds. For example, if the slice path with the best composite score indicates VNF1 at cloud-0, VNF2 at cloud-5, and VNF3 at cloud-6, the optimizer can send a message to an orchestrator process identifying these VNFs and clouds. The orchestrator can then instantiate VNF1 at the cloud location associated with cloud-0, VNF2 at a second cloud location associated with cloud-5, and VNF3 at a third cloud location associated with cloud-6. The orchestrator can also provide information to each VNF so that they can communicate with one another as intended for the service function chain of the slice.

Figure 1B:
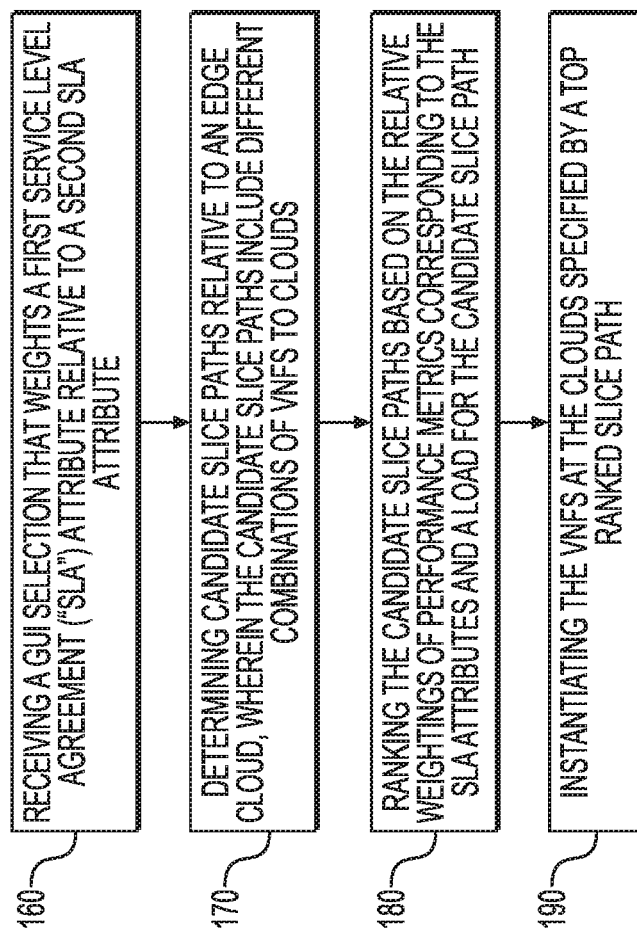
FIG. 1B is a flowchart of an example method for dynamic inter-cloud VNF placement in a slice path based on service-level agreement attribute weighting.

FIG. 1B is an example flow chart of stages for optimizing VNF placement in a slice path. At stage 160, the optimizer receives a GUI selection that weights a first SLA attribute relative to a second SLA attribute. The GUI can be part of an orchestrator console, in an example. Alternatively, it can be part of a tenant-facing portal that allows a tenant to control which SLA attributes should be prioritized.

In one example, the GUI includes a slider for moving a weight between two SLA attributes. This can allow one of the SLA attributes to be the priority or both SLA attributes to be equal (and therefore both priority). Alternatively, the GUI can allow selection of multiple SLA attributes and the user can set weights for each one. The SLA attributes can be weighted relative to one another based on the weights set for each one.

At stage 170, the optimizer can determine candidate slice paths relative to an edge cloud. This stage can occur as part of initially provisioning a slice. Additionally, the optimizer can dynamically perform stage 170 based on an orchestrator or the optimizer determining that a new slice path is needed, in an example. For example, an orchestrator can detect a high load at a particular cloud that is utilized by the current slice path. Alternatively, the orchestrator can detect that performance metrics for a slice no longer meet an SLA requirement. This can cause the optimizer to determine a new slice path to bring the slice back into SLA compliance or alleviate network load.

In one example, the optimizer can determine a neighborhood of clouds based on the maximum number of intercloud links. The optimizer can create a pool of candidate slice paths that includes every combination of the neighborhood of clouds, in an example, limited to the number of VNFs per candidate slice. Each candidate can have a unique VNF-to-cloud assignment combination, also referred to as a unique permutation. For example, a first candidate can assign VNF1 to cloud-0 and VNF2 to cloud-1, whereas a second candidate assigns VNF1 to cloud-0 and VNF2 to cloud-2. The permutations can also take into account the order of VNFs, since the service function chain can require traversing VNFs in order.

In another example, the optimizer omits candidate slice paths that do not satisfy the prioritized SLA attribute. For example, if the first SLA attribute is weighted more highly than the second SLA attribute, the optimizer can create a pool of candidate slice paths that satisfy the first SLA attribute. If both the first and second SLA attributes are prioritized, then the optimizer can determine a pool of candidate slice paths that have performance metrics satisfying both SLA attributes. However, if no candidates satisfy the SLA, then those with the closest performance can be kept as candidate slice paths.

At stage 180, the optimizer can rank the candidate slice paths based on the relative weightings of the first and second SLA attributes. In one example, this can include normalizing each of the corresponding SLA metrics of the candidate slice paths, then multiplying by the respective weight values. For example, if the first SLA metric is RTT and the second SLA metric is slice throughput, the first weight can be applied to the normalized RTT value and the second weight can be applied to the normalized throughput value. As explained for stages 130 and 140, normalizing can include applying a function to the metric values. The function applied can vary for different SLA attributes. For example, normalizing RTT can be done linearly by dividing by the SLA attribute value. Slice throughput, on the other hand, can have a non-linear function that favors high throughput by returning a much lower number once a throughput threshold is achieved.

In one example, the optimizer can use a lookup table to map performance metrics to normalized costs. Each dimension (e.g., each type of performance metric) can have a different normalization factor. The lookup table can define a transform function for each type of performance metric. The functions can be linear or non-liner and can be based on the SLA attributes for the slice. In one example, a normalized value of 0 to 1 indicates SLA compliance. As an example, a metric-to-cost table can map RTT values into float64 values that are normalized such that values between 0 and 1 satisfy the SLA for RTT, whereas any value above 1 does not satisfy the SLA.

In one example, the weights are applied to the normalized metric values for the candidate slice paths. By using consistent normalization, such as indicating SLA compliance when values are less than 1, weights can more accurately prioritize certain metrics over others for optimization purposes. Load values for the clouds can be normalized and weighted, as described for stage 130. This can allow the optimizer to then determine a top-ranked slice path based on a composite score that factors in both the weighted performance metrics and the weighted loads. The provider can shift the prioritization of load distribution versus performance as needed by dynamically adjusting the weight applied to the load versus performance metrics.

At stage 190, the top-ranked slice path can be provisioned. In one example, an orchestrator process instantiates VNFs at the corresponding clouds of the top-ranked slice path. This can include setting the VNFs to communicate with one another across the distributed cloud network.

The optimizer can continue monitoring the slice and occasionally re-perform stages 170, 180, and 190 if a performance metric becomes non-compliant with the SLA or the slice load exceeds a threshold. The optimizer can determine a new top-ranked slice path and an orchestration process can provision at least one of the VNFs at a new cloud. The orchestrator can also configure the other VNFs to communicate with the newly instantiated VNF. VNF instances that are no longer part of the function chain can be terminated.

Figure 2:
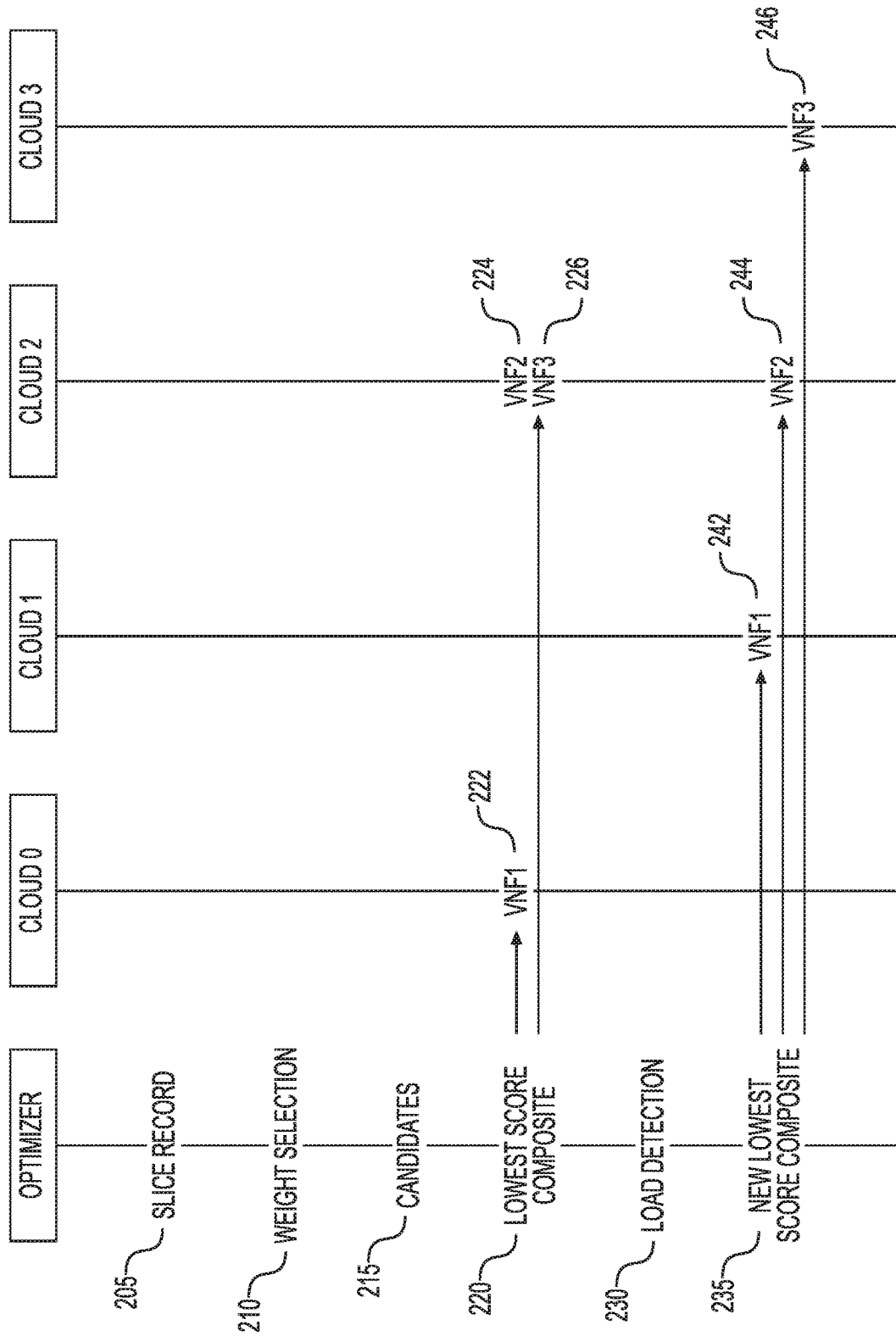
FIG. 2 is an example sequence diagram of example stages for dynamic inter-cloud placement of VNFs in a slice path.

FIG. 2 is an example sequence diagram for dynamically provisioning VNFs in a slice. At stage 205, the optimizer can read a slice record to retrieve one or more SLA attributes and information about the slice. The slice record can also identify which VNFs are needed in the slice path, specific VNF requirements, and monetary constraints.

At stage 210, the optimizer can retrieve weight values to apply to one or more performance metrics or loads. The weights can be input into a GUI in one example, such as by an administrator associated with the provider. In one example, the GUI allows tenant access for setting weights for SLA attributes, including setting which SLA attribute is a primary attribute for the slice. The weights can also be received as functions from an orchestrator as part of an optimization request, in an example. In one example, stage 210 can be performed later as part of stage 220, to determine a lowest score for composite slice paths.

At stage 215, the optimizer can determine candidate slice paths. This can be based on the SLA attributes received from the slice record at stage 205, in an example. In one example, the optimizer creates candidate slice paths that each have the same or fewer clouds as the number of VNFs or the maximum number of intercloud links. The optimizer can create a first set on that basis. The optimizer can then eliminate candidate slice paths that do not comply with one or more of the SLA attributes. The remaining candidate slice paths can make up the pool from which an optimal slice path is chosen. For example, this can include choosing the candidate slice path with the lowest composite score.

At stage 220, the optimizer can determine which of the candidate slice paths has the lowest composite score. This can include applying the weights received at stage 210. The performance metrics can be normalized and weighted. Similarly, load values can be normalized and weighted. Then these weighted values can be added together to result in a composite score. The top-ranked candidate slice path can be the one with the lowest composite score. In another example, the various functions and weights are fashioned to produce a high score for the top-ranked slice path.

The optimizer can then cause the VNFs to be provisioned at the specific clouds included in the top-ranked candidate slice path. In one example, the optimizer sends a request to an orchestrator process to perform the provisioning. Alternatively, the optimizer can be part of the orchestrator.

In this example, the top-ranked candidate slice path can specify that VNF1 is on cloud 0, which can be an edge cloud. It can also specify that VNF2 and VNF3 are both on cloud 2. Cloud 0 can be an index that the optimizer uses to look up provisioning information for a host server, cluster, or cloud location. Cloud 1, cloud 2, and cloud 3 can be other indices used for this purpose. At stage 222, the orchestrator can provision VNF1 at cloud 0. At stage 224, the orchestrator can provision VNF2 at cloud 2, and at stage 226 VNF3 can be provisioned at cloud 2. These VNFs can be configured by the orchestrator to talk to one another. Provisioning can include instantiating one or more VMs at each cloud location, including one or more vCPUs for executing the functionality of the respective VNF.

At stage 230, the optimizer (or orchestrator) can detect that a cloud is overloaded. If the slice is using the cloud, the optimizer can determine a new top-ranked slice path. For example, if cloud 2 has a load that exceeds a threshold, the new top-ranked slice path can be calculated at stage 235. This can include determining which slice path has the new lowest composite score. In this example, the new top-ranked slice path can place VNF1 at cloud 1, VNF 2 at cloud 2, and VNF3 at cloud 3. VNF3 can, for example, be vCPU intensive, such that moving it to cloud 3 helps balance network load.

Similarly, the optimizer (or orchestrator) can determine a new cloud path based on a performance metric no longer meeting an SLA attribute. The orchestrator can periodically check performance of the slice, in an example. If performance falls below the SLA requirements, a new slice path with the lowest composite score can be calculated at stage 235.

When a new slice path is determined, the orchestrator can provision the VNFs at their new locations at stages 242, 244, and 246. In one example, VNF2 is not re-provisioned, but instead is simply reset to talk to VNF1 and VNF3 at their new locations. In another example, all three VNFs are re-instantiated at the respective cloud locations when the new slice path is created.

Figure 3:
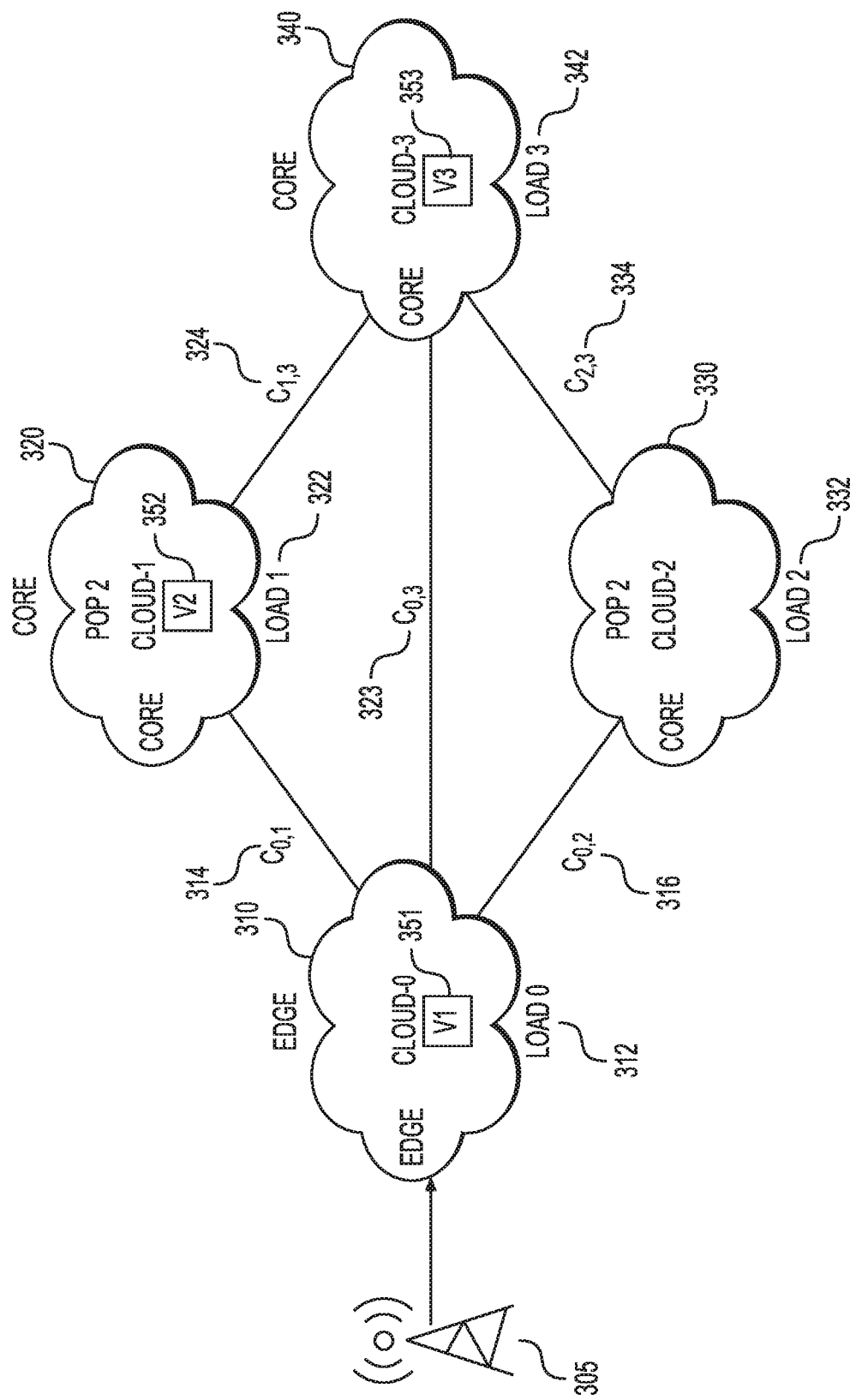
FIG. 3 is an example system diagram illustrating performance cost and load calculations for multiple clouds.

A detailed example of optimizer operation will now be discussed with reference to FIGS. 3 and 4A-D. FIG. 3 is an example system diagram for purposes of explaining how an optimizer determines candidate cloud paths and selects one based on a composite value. The composite value can represent multiple dimensions of performance metrics and loads, allowing for the optimizer to determine VNF placement based on both SLA requirements and cloud resource allocation. FIGS. 4A-D include example tables of values to explain various stages of the example optimizer operation.

In this example, an optimizer can determine cloud placement for three VNFs 351, 352, 353 in a service chain for a slice. These VNFs, also shown as V1, V2, and V3, can be provisioned on various clouds 310, 320, 330, 340 in the Telco network. The illustrated slice path includes V1 at edge cloud 310 (Cloud-0), V2 at a first core cloud 320 (Cloud-1), and V3 at a third core cloud 340 (Cloud-3). Access to the slice can occur from a cell tower 305, which sends data to Cloud-0.

Each cloud 310, 320, 330, 340 can communicate with the others using intercloud links with performance metric costs 314, 316, 323, 324, 334. The costs are represented by $C_p$, where p designates the slice path. For example, $C_{0,3}$ indicates a performance metric cost between Cloud-0 and Cloud-1. Additionally, each cloud 310, 320, 330, 340 can be assigned a load value 312, 322, 332, 342 based on load functions utilized by the optimizer. This can be a compute load based on total vCPU usage at the cloud, in an example.

To better explain some algorithmic stages performed by the optimizer in an example, the terminology of Table 1, below, can be used.

TABLE 1

| Term | Description |
| --- | --- |
| $C_p^k$ | Dimensional value for slice path p and metric k (e.g., RTT) |
| $\gamma_p^k$ | Normalized cost for slice path p and metric k, derived from $C_p^k$ |
| $\Gamma_p$ | Composite weighted cost for slice path p, derived from $\gamma_p^k$ over all k metrics. |
| $P_{SLA}$ | Set of candidate slice paths that satisfy the SLA |
| $P_{Opt}$ | Optimal slice path(s) given SLA and load constraints |

In one example, the optimizer can attempt to determine a new slice path that satisfies SLA requirements and balances the orchestration of resources in the multi-cloud environment of FIG. 3. This can be different than merely implementing a shortest path algorithm, such as Dijkstra, because multiple graphs can be considered across several domains, such as RTT, bandwidth, and cloud load. Each can contribute to a composite score and selection of an optimal slice path.

In this example, the slice can be defined as [V1, V2, V3] with the SLA specifying a maximum of 50 millisecond RTT on the slice. The weights, $w_k$, in this example can be $w_{RTT}=5$ for RTT and $w_{load}=0.5$ for cloud load.

The optimizer can determine a neighborhood of available clouds relative to the edge cloud 310 (Cloud-0). This can include limiting the available clouds based on the number of VNFs and the maximum number of intercloud links. In this example, seven other neighboring clouds can be available for VNF placement. Each of these clouds can be given an index.

This neighborhood can be used to determine candidate slice paths. A few such candidate slice paths are shown in FIG. 4A. This table uses the slice's VNFs at column indices 410 and each row 405 represents a potential candidate slice path. For example, candidate slice path 412 can map V1 to Cloud-0, V2 to Cloud-1, and V3 to Cloud-3. This corresponds to the slice path shown in FIG. 3. FIG. 4A illustrates just four such candidate slice paths, but many more can be determined. In one example, the optimizer creates a first set of slice paths that includes every unique combination of VNFs to the neighborhood clouds, relative to the edge cloud (Cloud-0).

The optimizer can measure a load value for each available cloud. FIG. 4B presents load measurements for the neighborhood of available clouds. In this table, each cloud has an index 415 and a load value 420. For example, Cloud-0, an edge cloud, can be 99.3% utilized. Cloud-2, on the other hand, is only 17.8% utilized. In this example, load can represent the fraction of proportionally allocated compute resources currently required for this slice at the respective cloud. In an alternate example, load can represent the absolute value of computer resources at the cloud.

Next, the optimizer can measure the performance metric for RTT for each candidate cloud path. To do this, the optimizer can create a matrix with RTT values between each pair of clouds. FIG. 4C illustrates the RTT matrix. The row index 425 can correspond to source clouds and the column index 430 can correspond to destination clouds. The value at each location in the table can represent RTT in milliseconds between the source and destination clouds. In this example, RTT for the same cloud as source and destination is estimated to be 1 millisecond. The other intercloud links have RTT values between 10 and 50 milliseconds. The optimizer can create similar matrices for other performance metrics, in an example.

Next, the optimizer can determine dimensional costs (also called values), $C_P^k$, of the performance metrics and loads for each candidate slice path. FIG. 4D illustrates example dimensional costs 445 for cloud load 446 and RTT 447. These values can be determined for candidate slice paths 425 having different cloud placements 440 for the three VNFs. As one example, candidate slice path 465, PATH 53, includes a cloud load of 1.031 and an RTT of 24.8. $C_{53}^{RTT}$ be determined by the optimizer by adding $C_{0-3}$ and $C_{3-3}$, representing RTT across the clouds 472 of PATH 53. Using the matrix of FIG. 4C to retrieve $C_{0-3}$ and $C_{3-3}$, this equates to 23.8+1.0=24.8, which is shown in FIG. 4D for the dimensional cost 445 of RTT 447 of PATH 53. In other examples, a different method of deriving the dimensional costs is possible.

The optimizer can determine the other dimensional costs 445 for load 446 and RTT 447 following this methodology to solve for $C_P^k$. For each possible candidate slice path, the optimizer can sum the corresponding RTT values and load values.

Next, the optimizer can determine normalized costs 450 by applying normalization functions to the dimensional costs 445. The normalization function, $f_k$, can vary for different dimensional costs, but can result in normalized costs 450. Example methods for solving for $\gamma_p^k$ can include any of Equations 1-3 below.

$$\gamma_p^k = f_k(C_P^k) \qquad \text{Equation 1}$$

$$\gamma_p^k = \frac{C_P^k}{C_{SLA}^k} \qquad \text{Equation 2}$$

$$\gamma_p^k = \frac{C_{SLA}^k}{C_P^k} \qquad \text{Equation 3}$$

As shown above in Equations 2 and 3, the normalization function can be relative to the SLA attribute corresponding to the dimensional cost (e.g., performance metric value) being normalized. In one example, if the normalized value is between 0 and 1, the SLA is satisfied. Otherwise, the SLA is violated.

Turning to the example normalized costs 450 in FIG. 4D, the candidate slice paths 425 all have normalized RTT values between 0 and 1. In this example, the optimizer has removed other slice paths that do not comply with the SLA for RTT. Of note, PATH 168 satisfies the SLA the most with a normalized RTT value 476 of 0.040. However, PATH 168 also includes a relatively poor load value 475 of 11.913 because in that slice path all of the VNFs are assigned to the edge cloud (Cloud-0).

Next, the optimizer can apply weights, $w_k$, to the normalized costs to create weighted costs 455. The weights can be adjusted or specified by the orchestrator or an administrator. Performance metric weights, such as for RTT, can be modified by the tenant in an example. Applying the weights of this example, $w_{RTT}$=5 for RTT and $w_{load}$=0.5 for cloud load, yields the composite values 460 by which the optimizer can rank the candidate slice paths 425.

In this example, the top-ranked candidate slice path 465 is PATH 53, with the lowest composite value 470. Of note, the RTT for PATH 53 is not the lowest available RTT, which belongs to PATH 168. But PATH 53 provides a better balance of network load while still maintaining SLA compliance. Therefore, it has the best composite score and is selected as the optimal slice path, $P_{Opt}$.

In one example, the optimizer can determine composite weighted cost 455 using Equation 4, below.

$$\Gamma_p = \frac{\sum_{k=1}^{K} w_k \gamma_p^k}{\sum_{k=1}^{K} w_k} \qquad \text{Equation 4}$$

$P_{Opt}$ can be selected based on the lowest value for $\Gamma_p$, in an example.

Figure 5:
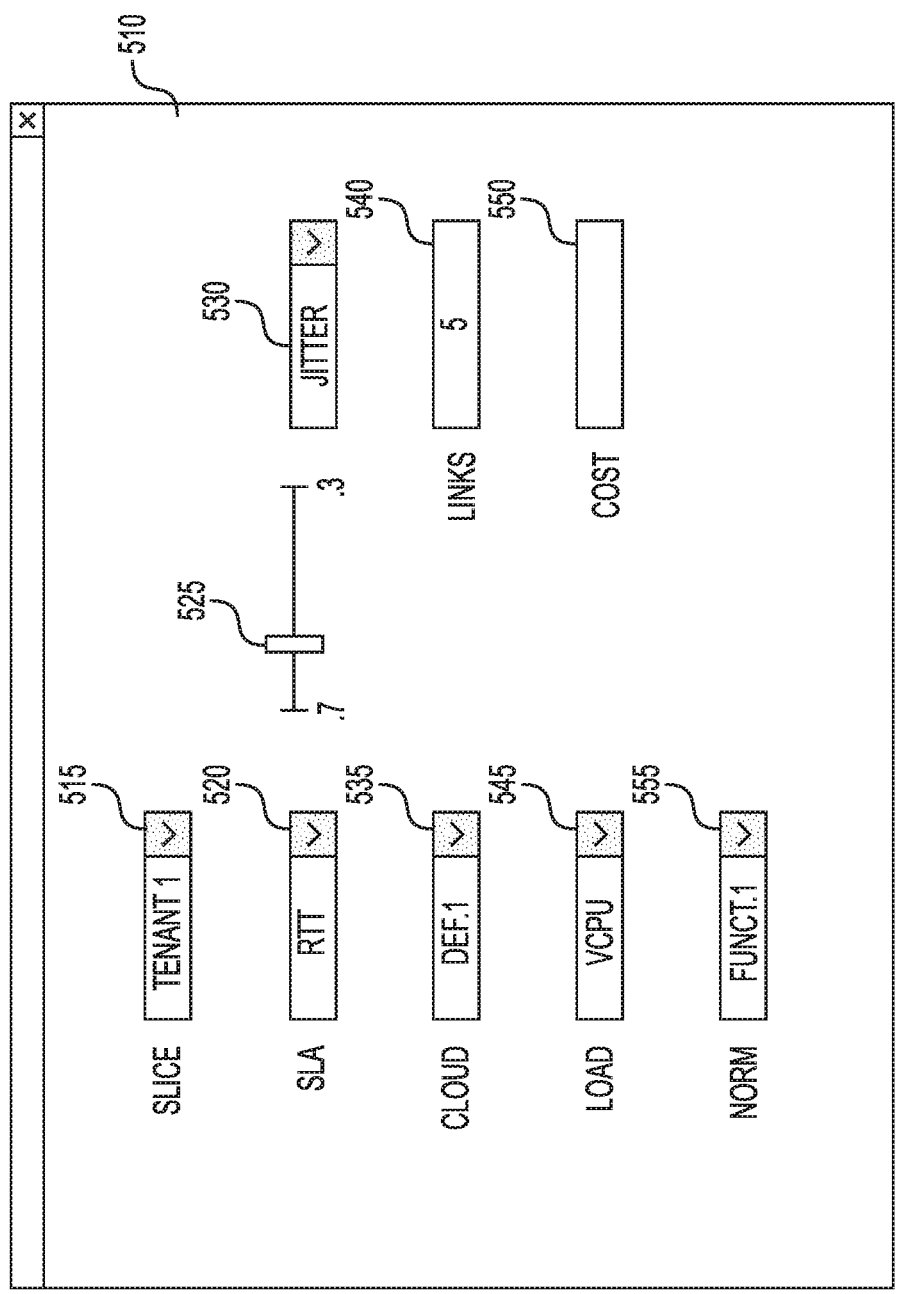
FIG. 5 is an example illustration of a graphical user interface ("GUI") screen.

FIG. 5 is an example illustration of a GUI screen 510 for adjusting optimizer performance in selecting VNF placement in a slice. The GUI can allow an administrator to configure various aspects of the optimizer functionality.

In one example, an administrator can select a slice record 515. The slice record can be associated with a tenant, in an example. The slice record can provide a definition of a service function chain, including which VNFs are part of the slice and what compute resources each need. The slice record can also indicate interservice link needs for the VNFs. In one example, the slice record includes SLA requirements. Additional VNF attributes can also be included in the slice record. For example, a VNF preference for a core or edge node can be included. Another example VNF preference can include geographic criteria. For example, a service running only in San Francisco can include a VNF preference for that area. The slice record can also specify a particular edge node, in one example.

The GUI can include a field for configuring the degree to which the optimizer determines candidate cloud paths, in one example. For example, the GUI can contain a field 540 for entering the maximum number of intercloud links. The administrator or an orchestration process can increase or decrease this number to change the edge radius—that is, the number of permitted links to other clouds. This can control the pool size of the candidate slice paths in an example.

When the number is lowered, this can increase computing efficiency for the dynamic inter-cloud placement of VNFs.

The GUI can also include fields 520, 530 for selecting SLA attributes. In one example, these fields 520, 530 can be dropdown selectors that include all of the SLA attributes from the slice record. In this example, SLA attributes related to RTT and jitter have been selected. The GUI also can contain a control 525 for weighting the SLA attributes. In this example, the control 525 is a slider that simultaneously increases the weight of one attribute while decreasing the weight of another. However, in another example, the GUI can include individual weight controls for adjust weights relative to multiple SLA attributes.

The weights can be used by the optimizer for determining the top-ranked slice path. In one example, the highest weighted SLA attribute can be treated as the primary SLA attribute and used to determine which slice paths are candidate slice paths.

Another field 535 can be used to apply particular cloud definitions to the optimizer. In one example, this can include selecting a file that defines attributes for one or more clouds. For example, a provider may need to designate geographical characteristics of a cloud (for example, located in Kansas or California). If tenant wants a geographically specific use, such as smart cars in California, the specification for clouds in California can be used by the optimizer to limit the potential candidate slice paths. The optimizer can consider all attributes ascribed to a VNF against various attributes ascribed to clouds. In one example, a cloud map can be presented on the GUI, allowing the provider to lasso some clouds and define attributes or apply settings.

The administrator can also select load functions using a GUI element 545 in one example. The selected load function or functions can determine how cloud load is defined and calculated. In this example, the selection bases load on vCPU usage. However, the load function can be flexible and based on other attributes. For example, the load can be an absolute value of compute resources at a cloud or it can be the fraction of proportionally allocated compute resources being used by the slice at the respective cloud.

The GUI can also provide a selection 555 of normalization functions. For example, a script, file, or table can define which functions are applied to which SLA attributes or loads. The functions can be linear or non-linear. The goal of the normalization can be to normalize performance metrics relative to each other and to the load metrics. This can allow the weights to more accurately influence the importance of each in determining optimal VNF placement in the slice.

In one example, normalization functions are provided as a metric-to-cost transform table. The table can map particular performance metrics to normalized metric values that are based on SLA satisfaction. For example, functions for different metric types can map the metrics of each cloud to normalized numbers between 0 and 1 when the SLA is satisfied, and numbers greater than 1 when it is not. Lower numbers can indicate a higher degree of satisfaction. Therefore, a number slightly greater than 1 can indicate the SLA is nearly satisfied. In extreme cases where network load results in no candidate slice paths that satisfy the SLA, candidate slice paths can be ranked based on how close they are to 1. Although the number 1 is used as an example normalized SLA threshold, other numbers can be used to the same effect in different examples.

The GUI can also include one or more fields 550 for displaying or defining monetary cost maximums. Monetary costs can vary for each cloud, depending on the cloud's current load and the amount of load required for a particular VNF. In one example, cloud paths are negatively weighted when the total cost for VNF placement exceeds cost maximums. Monetary costs can be normalized similarly to performance metrics or loads. The normalization functions of selection 555 can include functions for normalizing slice path costs, in an example. This can allow costs to be weighted and included in the composite scoring.

Figure 6:
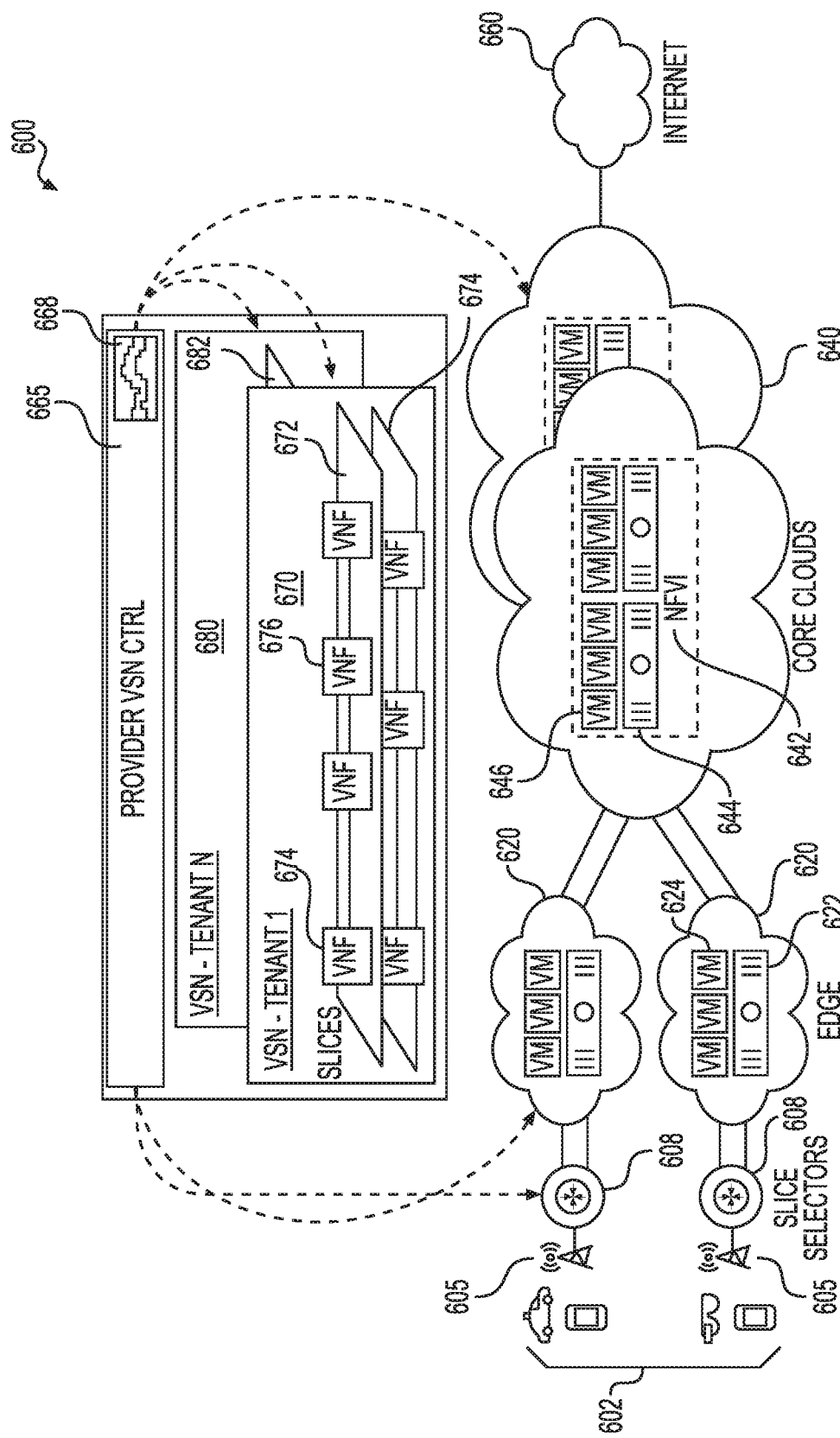
FIG. 6 is an example system diagram of a topology for dynamic inter-cloud VNF placement in a slice path.

FIG. 6 is an example system diagram including components for dynamic inter-cloud VNF placement in slices. As illustrated, a distributed Telco cloud network 600 can include edge clouds 620 and core clouds 640. Slices 672, 678, 682 can be distributed across these clouds 620, 640.

Each cloud 620, 640 can have physical and virtual infrastructure for network function virtualization ("NFV") 642. For example, physical servers 644, routers, and switches can run VMs 646 that provide VNF functionality. A slice can include a first VNF that executes on an edge cloud 620. The VNF can utilize one or more vCPUs, which can be one or more VMs 624 in an example. However, the edge cloud 620 can execute numerous VNFs, often for multiple tenants where the VNFs are part of various slices. The slices can be kept separate from a functional perspective, with VNFs from different slices not aware of the existence of each other even when they rely on VMs 624 operating on shared physical hardware 622.

A first VNF in the slice path can communicate with a second VNF, which can be located in a different cloud 640. For example, the second VNF can include one or more VMs 646 operating on physical hardware 644 in a core cloud 640. The second VNF can communicate with yet another VNF in the slice path. One or more of these VNFs can act as an egress to the internet 660, in an example.

One or more user devices 602 can connect to a slice in the Telco network 600 using, for example, a 3G, 4G, LTE, or 5G data connection. The user devices 602 can be any physical processor-enabled device capable of connecting to a Telco network. Examples include cars, phones, laptops, tablets, IoT devices, virtual reality devices, and others. Cell towers 605 or other transceivers can send and receive transmissions with these user devices 602. At the ingress point to edge clouds 620, slice selectors 608 can receive data sent from the user devices 602 and determine which slice applies. The slice selectors 608 can operate as VMs 624 in the edge cloud or can run on different hardware connected to the edge cloud 620.

To manage the distributed virtual infrastructure, a provider can run a topology 665 of management processes, including an orchestrator 668. The orchestrator 668 can include the optimizer process. Alternatively, the optimizer can be part of the topology 665 that works with the orchestrator 668.

The orchestrator can be responsible for managing slices and VNFs, in an example. This can include provisioning new slices or re-provisioning existing slices based on performance metrics and network load. The orchestrator can run on one or more physical servers located in one or more core clouds 640 or separate from the clouds. The orchestrator 668 can provide tools for keeping track of which clouds and VNFs are included in each slice. The orchestrator can further track slice performance for individual tenants 670, 680, and provide a management console such as shown in FIG. 5. The orchestrator 668 can also receive performance metrics and load information and determine when the optimizer should find a new slice path.

In this example, a first tenant 670 has multiple slices 672, 674. Each slice 672, 678 can be defined by a slice record that indicates VNF requirements for that slice. VNFs can each provide different functionality in the service chain. In addition, VNF attributes can be used to favor certain clouds over others. For example, a first slice can have a first VNF 674 that must be an edge cloud 620 at a particular location. The first slice can also have a second VNF 676 that acts as an egress point, and therefore is best placed in a core cloud 640.

The orchestrator 668 can rely on the optimizer to dynamically determine VNF placement for a slice path. Then, the orchestrator 668 can provision VNFs based on the determinations made by the optimizer. This can include instantiating new VMs at the clouds 620, 640 identified by the optimizer. The orchestrator 668 can also change settings in the slice selectors 608 to ensure traffic reaches the correct slice 670.

Although the orchestrator, virtual management topology, and optimizer are referred to separately, these processes can all operate together. The examples are not meant to limit which process performs which step. Instead, the optimizer can be considered any portion of the virtual management topology that performs the described stages.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for dynamic inter-cloud placement of virtual network functions ("VNFs") in a slice path, comprising:
    determining candidate slice paths relative to an edge cloud, wherein the candidate slice paths are different permutations of VNF-to-cloud assignments, the permutations being limited by a number of VNFs or a maximum number of intercloud links;
    scoring candidate slice paths based on performance metric values and load values for the candidate slice paths, wherein the performance metric corresponds to a service level agreement ("SLA") attribute;
    selecting a composite slice path based on the scores of the candidate slice paths; and
    provisioning the VNFs at corresponding clouds specified by the selected composite slice path.

2. The method of claim 1, wherein the respective load values of the candidate slice paths are determined by at least summing loads for clouds in the respective candidate slice path.

3. The method of claim 1, further comprising:
    creating a matrix that maps the performance metric to clouds in the candidate slice paths, wherein the performance metric of a candidate slice path is derived from values in the matrix; and
    when at least one candidate slice path complies with the SLA attribute, eliminating candidate slice paths that are non-compliant with the SLA requirement.

4. The method of claim 3, wherein the SLA attribute is a minimum bandwidth.

5. The method of claim 1, further comprising:
    detecting network congestion or a performance metric below an SLA requirement;
    determining new candidate slice paths; and
    provisioning at least one of the VNFs at a new cloud specified by a new composite slice path, the new composite slice path having a best composite score among new candidate slice paths based on a combination of a weighted performance metric and weighted load for the new candidate slice paths.

6. The method of claim 1, further comprising:
    for each candidate slice path, calculating a normalized cost of the performance metric; and
    when no candidate slice path includes a normalized cost that meets an SLA threshold, ranking the candidate slice paths based on how close the normalized cost is to the SLA threshold.

7. The method of claim 1, wherein determining the candidate cloud paths includes:
    determining a first set of slice paths that includes all permutations of VNF-to-cloud assignments that are within the number of VNFs and maximum number of intercloud links;
    determining a second set of slice paths that complies with the SLA attribute; and
    taking an intersection of the first and second sets.

8. A non-transitory, computer-readable medium comprising instructions that, when executed by a processor, perform stages for dynamic inter-cloud virtual network function ("VNF") placement in a slice, the stages comprising:
    determining candidate slice paths relative to an edge cloud, wherein the candidate slice paths are different permutations of VNF-to-cloud assignments, the permutations being limited by a maximum number of intercloud links;
    scoring candidate slice paths based on performance metric values and load values for the candidate slice paths, wherein the performance metric corresponds to an attribute requirement for one of round-trip time and bandwidth;
    selecting a composite slice path based on the scores of the candidate slice paths; and
    provisioning the VNFs at corresponding clouds specified by the selected composite slice path.

9. The non-transitory, computer-readable medium of claim 8, wherein the respective load values of the candidate slice paths are determined by at least summing loads for clouds in the respective candidate slice path.

10. The non-transitory, computer-readable medium of claim 8, further comprising:
    creating a matrix that maps the performance metric to clouds in the candidate slice paths, wherein the performance metric of a candidate slice path is derived from values in the matrix; and
    when at least one candidate slice path complies with the attribute requirement, eliminating candidate slice paths that are non-compliant with the attribute requirement.

11. The non-transitory, computer-readable medium of claim 10, wherein the attribute requirement is a maximum round-trip time.

12. The non-transitory, computer-readable medium of claim 8, the stages further comprising:
    detecting network congestion or a performance metric that does not meet the attribute requirement;
    determining new candidate slice paths; and
    provisioning at least one of the VNFs at a new cloud specified by a new composite slice path, the new composite slice path having a best score among new candidate slice paths based on a combination of a weighted performance metric and weighted load for the new candidate slice paths.

13. The non-transitory, computer-readable medium of claim 8, the stages further comprising:
for each candidate slice path, calculating a normalized cost of the performance metric; and
when no candidate slice path includes a normalized cost that meets an SLA threshold, ranking the candidate slice paths based on how close the normalized cost is to the SLA threshold.

14. The non-transitory, computer-readable medium of claim 8, wherein determining the candidate cloud paths includes:
determining a first set of slice paths that includes all permutations of VNF-to-cloud assignments that are within the number of VNFs and maximum number of intercloud links;
determining a second set of slice paths that complies with the SLA attribute; and
taking an intersection of the first and second sets.

15. A system for dynamic inter-cloud virtual network function ("VNF") placement in a slice, comprising:
a non-transitory, computer-readable medium containing instructions; and
a processor that executes the instructions to perform stages comprising:
determining candidate slice paths relative to an edge cloud, wherein the candidate slice paths are different permutations of VNF-to-cloud assignments, the permutations being limited by a number of VNFs;
scoring candidate slice paths based on performance metric values and load values for the candidate slice paths, wherein the performance metric corresponds to a bandwidth requirement;
selecting a composite slice path based on the scores of the candidate slice paths; and
provisioning the VNFs at corresponding clouds specified by the selected composite slice path.

16. The system of claim 15, wherein the respective load values of the candidate slice paths are determined by at least summing loads for clouds in the respective candidate slice path.

17. The system of claim 15, the stages further comprising:
creating a matrix that maps the performance metric to clouds in the candidate slice paths, wherein the performance metric of a candidate slice path is derived from values in the matrix; and
when at least one candidate slice path complies with the bandwidth requirement, eliminating candidate slice paths that are non-compliant with the bandwidth requirement.

18. The system of claim 15, the stages further comprising:
detecting network congestion or a performance metric below an SLA requirement;
determining new candidate slice paths; and
provisioning at least one of the VNFs at a new cloud specified by a new best composite slice path, the new best composite slice path having a new best composite score based on a combination of a weighted performance metric and weighted load for the new candidate slice paths.

19. The system of claim 15, the stages further comprising:
for each candidate slice path, calculating a normalized cost of the performance metric; and
when no candidate slice path includes a normalized cost that meets an SLA threshold, ranking the candidate slice paths based on how close the normalized cost is to the SLA threshold.

20. The system of claim 15, wherein determining the candidate cloud paths includes:
determining a first set of slice paths that includes all permutations of VNF-to-cloud assignments that are within the number of VNFs and maximum number of intercloud links;
determining a second set of slice paths that complies with the SLA attribute; and
taking an intersection of the first and second sets.

* * * * *